United States Patent
Strickland

[19]

[11] Patent Number: 6,134,789
[45] Date of Patent: Oct. 24, 2000

[54] GRASS TRIMMER FOR POPUP SPRINKLERS

[76] Inventor: Frederick Wayne Strickland, 1520 Blueberry Dr., Titusville, Fla. 32780

[21] Appl. No.: 09/351,023

[22] Filed: Jul. 12, 1999

[51] Int. Cl.[7] .................................................. A01B 45/04
[52] U.S. Cl. .......................... 30/276; 30/300; 30/DIG. 7; 172/13
[58] Field of Search .................. 172/13; 30/276, 30/287, 300, 316, DIG. 7

[56] References Cited

U.S. PATENT DOCUMENTS

| | | |
|---|---|---|
| 542,584 | 7/1895 | Carter . |
| 1,791,957 | 2/1931 | Cummings ................................ 30/316 |
| 1,857,383 | 5/1932 | Johnson ................................... 30/316 |
| 3,017,733 | 1/1962 | Evans . |
| 3,028,669 | 4/1962 | Caskey et al. ............................ 30/276 |
| 3,057,064 | 10/1962 | Bertolino . |
| 3,062,299 | 11/1962 | Knepfinger . |
| 3,174,224 | 3/1965 | Rousselet . |
| 3,554,293 | 1/1971 | Aman et al. .............................. 172/13 |
| 3,555,680 | 1/1971 | Ford ........................................ 30/276 |
| 3,657,814 | 4/1972 | Bohlman . |
| 3,747,213 | 7/1973 | Green et al . |
| 3,747,214 | 7/1973 | Bohlman . |
| 3,814,189 | 6/1974 | Thompson . |
| 3,905,103 | 9/1975 | Ford et al . |
| 3,923,102 | 12/1975 | Morris ...................................... 172/13 |
| 3,960,218 | 6/1976 | Atchley . |
| 4,068,377 | 1/1978 | Kimmel . |
| 4,357,752 | 11/1982 | Goodwin, Jr. . |
| 4,547,966 | 10/1985 | Edien . |
| 4,845,929 | 7/1989 | Kawasaki . |
| 4,862,682 | 9/1989 | Wait . |
| 5,242,024 | 9/1993 | Van Houten .............................. 172/19 |
| 5,461,788 | 10/1995 | Taylor ...................................... 30/300 |
| 5,493,783 | 2/1996 | Oostendorp . |
| 5,862,658 | 1/1999 | Howard . |

*Primary Examiner*—Hwei-Siu Payer

[57] ABSTRACT

This invention relates to the cutting or trimming of grass directly over the top of the pop-up sprinkle head's shaft. In the past the grass and roots would cross over the path of the sprinkle's pop-up shaft restricting or stopping the upward movement of the shaft and deflecting or stopping the water spray pattern of the sprinkle. This invention will cut a very narrow cylindrical shaped hole down to the top of the pop-up head of the sprinkler eliminating the unsightly bowl shape cut in the grass of the prior patents and leaving a clean unrestricted small opening in the grass.

10 Claims, 4 Drawing Sheets

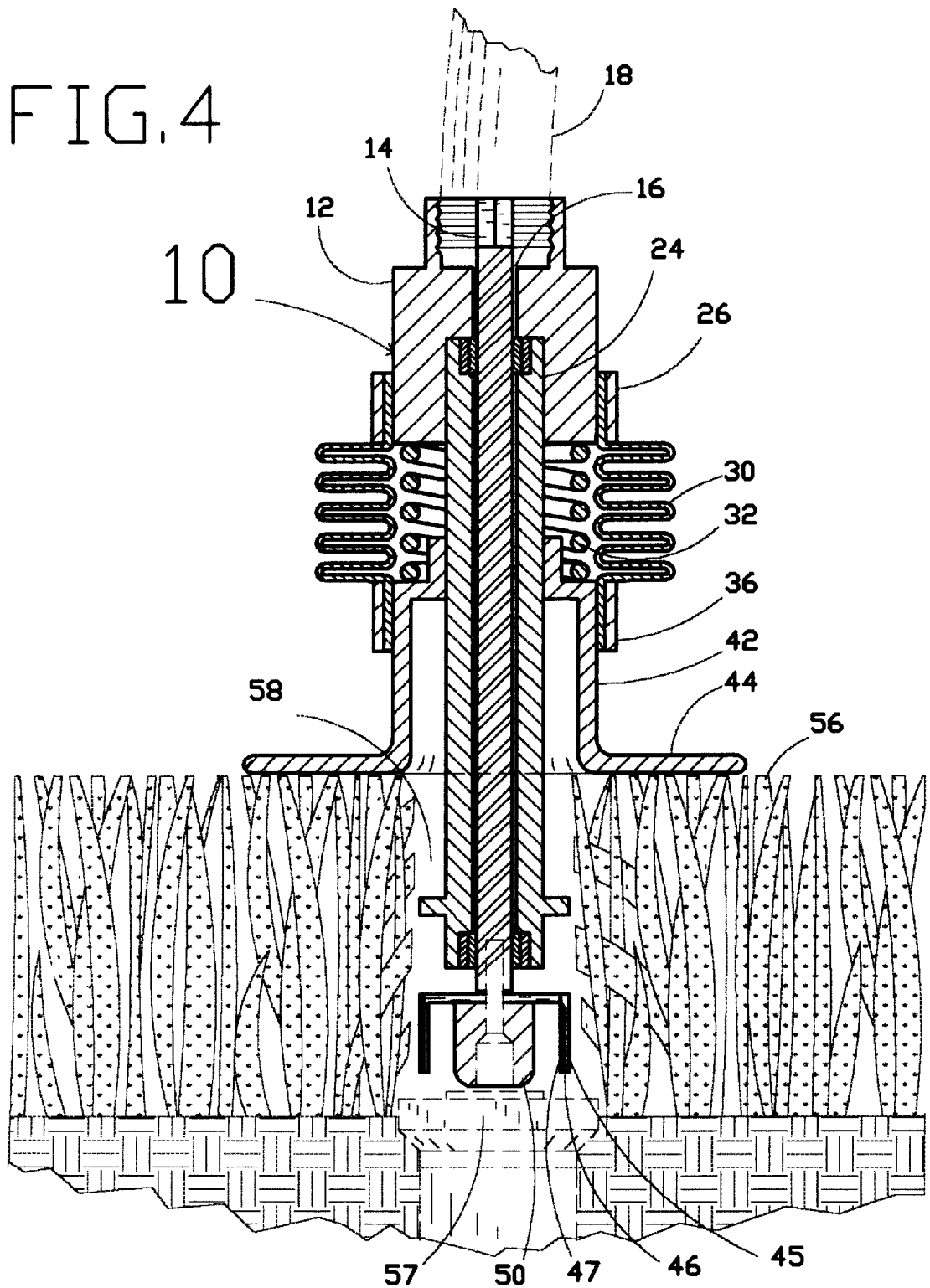

GRASS TRIMMER FOR POPUP SPRINKLERS

FIELD OF INVENTION

The present invention, directed at improvements in hand held grass trimmers, cuts a small cylindrical hole in the grass down toward the sprinkler's pop-up head. This leaves only a small hole in the lawn that is almost visibly undetectable but allows the pop-up sprinkler's shaft to extend up through and above the level of the grass.

BACKGROUND OF THE INVENTION

Sprinkler systems designed for private and public use generally have hole-recessed or pop-up sprinkler heads for distributing water. Eventually grass tends to spread into the cavity, choking off the spray of water and restraining the upward movement of the sprinkler's pop-up shaft. Since this is a common problem with gardeners, most find the job difficult and tedious to remove grass from around sprinkler heads. This is accomplished with hand shears or hand held grass trimmers that are designed to make large diameter cuts parallel to the surface of the ground. A person trying to trim grass from around a pop-up sprinkler head will eventually cut a large bowl shaped depression in the grass around the sprinkler head. This depression will be the same size as the length of the filament or blade of the grass trimmer, in the range of 8 to 16 inches. There are also health hazards considering the vertical angle the filament or blades must be rotated to trim the grass down to the popup sprinkler's head. The centrifugal force of the rotating filaments or blades will throw sand, small rocks, grass and other debris up into the air and onto the person trimming the grass. Additionally, the filaments have a tendency to snag and break when rotated in the vertical angle, and rotating plastic or steel blades can cause damage to the plastic pop-up sprinkler heads. The disadvantages to this method are obvious.

CROSS-REFERENCE TO RELATED APPLICATIONS

Manual and power operated rotary mowing and edging devices are well known in the prior art. Thus, for example, one such device is disclosed in U.S. Pat. No. 3,905,103 to Ford (1975). The device in the Ford patent is stated to be useful for trimming grass and removing dirt accumulated around a sprinkler head. Ford's patent accomplishes its purpose but leaves a large diameter hole in the grassy and dirt areas and even deeper holes in the lawn when used on pop-up sprinkler heads.

Another similarly device is shown in U.S. Pat. No. 4,357,752 Goodwin (1982), which teaches a sprinkler head grass clipper having a generally cylindrical upright body for alignment over the sprinkler head to which is connected a plurality of outwardly extending cutting wires.

Another device in this class is shown in U.S. Pat. No. 3,747,213 Green (1973), consisting of a rotor on the end of a shaft having laterally extending blades directed downward and inward towards the sprinkler head. It is suggested that the motion of the rotor and blades will cut a cone shaped path of grass. However, since there is mostly grass embedded soil accumulated around the sprinkler head, the blades will obviously undercut the dirt. Accordingly, it is apparent the cone shaped path cut into the grass has an unattractive, concave look.

Yet another device in this class is shown in U.S. Pat. No. 3,017,733 to Evans (1962). The Evans patent describes a lawn edger that is adapted for trimming or cutting grass or weeds growing close to a wall or other structure. It is unsuitable for making vertical cuts.

U.S Pat No. 3,057,064 to Bertolino (1962) depicts a trimmer for sprinkler heads that are embedded in a lawn. The angle of the cutting blade will leave an unattractive cone shaped depression around the sprinkler head.

It is evident that a hand turning tool such as the one illustrated in U.S. Pat. No. 3,062,299 to Koepfinger (1962) would require a great deal of manual torque to rotate and push the cutting teeth downward into the grass and dirt leaving an undesirable look.

The device portrayed in U.S. Pat. No. 3,174,224 to Rousselet (1965) is intended to provide a means for cutting grass over and adjacent to the sprinkler heads, but it too has the undesirable look of the bowl shape cut into the grass.

It is, therefore, a primary objective of the invention to provide a trimmer device for trimming straight down to the top surface of the pop-up sprinkler head, leaving a very small cylindrical hole in the lawn that will be visibly undetectable, ensuring a clean cut lawn.

Another objective of the invention is to provide a safety shield with a spring device for keeping the safety shield extended outward, enclosing the blades.

Still another objective of the invention is to provide a safety shield that will stay in close proximity to the ground while performing the downward cutting action.

A further objective of the invention is to provide a small cutting blade the same diameter as the sprinkler head to cut a small diameter hole down through the grass and roots that have blocked the passage to the pop-up sprinkler head. This will leave most of the grass around the sprinkler head area undisturbed. The small holes will not be seen in the grass, increasing the beauty of the lawn.

Yet another objective of the invention is to provide a flexible boot over the sliding safety guard and stationary casing to maintain cleanliness of the internal parts.

One last objective of this invention is to provide a lightweight, low cost, universal type connection to a hand held drill or a gas motor driven device (like a weed eater).

Additional objectives and advantages of the present invention are set forth in part by the description that follows, and in part it will be obvious from the implementation and direct use of this invention. The objectives and advantages may be realized and attained by means of the instrumental and combinations particularly specified in the appended claims.

BRIEF SUMMARY OF THE INVENTION

The present invention is intended to provide a grass trimmer for cutting grass and roots away from the areas that have covered the tops of the pop-up sprinkler head's shaft, so that dispensing of water therefrom is unobstructed. This trimmer will only leave a small cylindrical hole in the lawn that is almost visibly undetectable. It will be observed that one end of the grass trimmer for pop-up sprinklers will be connected to a proper power source such as an electric drill or gas powered motor at the universal adapter end and clamped to the power source's housing. When the power source is turned on, it will rotate the blade drive shaft to a desirable rotating speed for trimming grass. At this time the "u" shaped blades are rotating inside the protective safety shield and it is safe to move to the next cutting area. To trim grass a person will lower the safety shield base down onto the grass and over the center of the pop-up sprinkler head.

Pressing downward on the power source will start to compress the safety shield spring. The action of the casing support shaft sliding through the safety shield and passing the safety shield base will expose the casing shift and blades. By continually pressing downward until the sprinkler head protector makes contact with the sprinkler's head, the process of cutting a small cylindrical hole down through the grass and to the top surface of the sprinkler head will be completed. The safety shield base will remain horizontal to the surface of the grass, protecting the person from flying debris as the cutting blade cuts through the grass and roots. When the person starts to release the downward pressure the safety shield spring will expand and forcibly slide the safety shield away from the motor end and down the case's support shaft toward the blades, until the blades are completely covered by the safety shield. This completes the process of trimming lawns without leaving unsightly bowl shaped depressions next to the edge of the sidewalk and in other areas of the lawn.

With these and other objects in view, the invention will be best understood from a consideration of the following detailed description taken in connection with the accompanying drawing, forming a part of this specification. This is with the understanding, however, that the invention is not confined to any strict conformity with the showing of the drawing but may be changed or modified so long as such changes or modifications mark no material departure from the salient features of the invention as expressed in the appended claims.

BRIEF DESCRIPTION OF THE SEVERAL VIEWS OF THE DRAWING

FIG. 4 Is a sectional view showing the grass and pop-up sprinkler head after cutting.

DRAWING REFERENCE NUMERALS

10 Grass Trimmer for Pop-Up Sprinklers
12 Casing
14 Motor Spine
15 Casing Nut
16 Casing Though Hole
18 Electric Motor/Gas Driven Device
20 Casing Support Recess
22 Upper Bearing
24 Casing Support Shaft
26 Upper Flexible Boot Clamp
27 Upper Bearing Recess
28 Blade Shaft Through Hole
30 Flexible Boot
32 Safety Shield Spring
34 Safety Shield Spring Guide
36 Lower Flexible Boot Clamp
37 Safety Shield Hole
38 Safety Shield Flange
40 Blade Drive Shaft
41 Shaft's Threaded End
42 Safety Shield
44 Safety Shield Base
45 Angled Trailing Edge of Blade
46 Blade
47 Cutting Leading Edge of Blade
48 Sprinkler Head Protector Screw
49 Blade Hole
50 Sprinkler Head Protector
52 Lower Bearing
54 Lower Bearing Recess

DETAILED DESCRIPTION OF THE INVENTION

Figure 1:
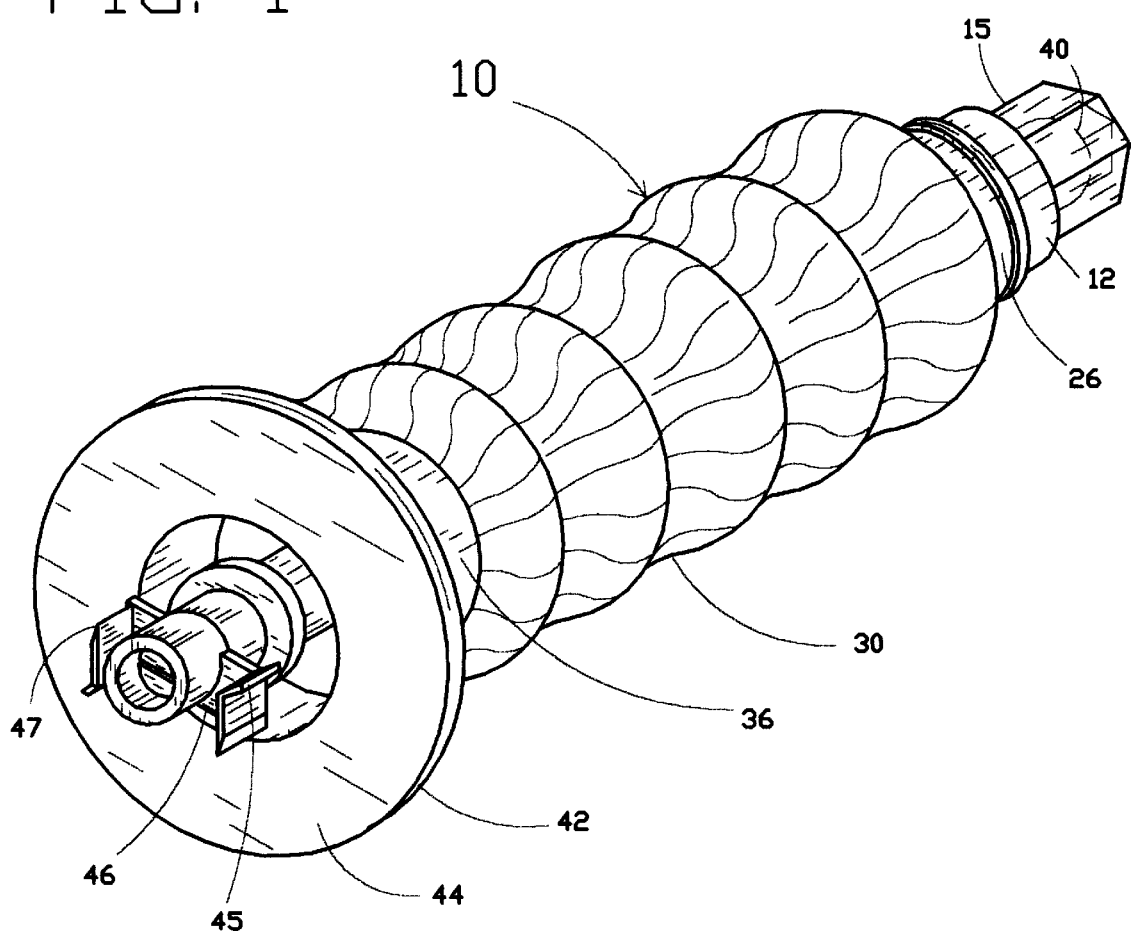
FIG. 1 Is a perspective view of the Grass Trimmer for Pop-Up Sprinklers.

Referring to the drawing wherein like numerals are used to designate similar parts throughout the several views, the reference numeral 10 indicates generally a Grass Trimmer for Pop-Up Sprinklers embodying the principles of the invention. FIG. 1 shows a Grass Trimmer 10 for Pop-Up Sprinklers having a casing 12 supporting a flexible boot 30 and an upper flexible boot clamp 26. Also shown are a safety shield 42 and a lower flexible boot clamp 36. A "u" shaped blade 46 is supported by a blade drive shaft 40 and is interconnected by a sprinkler head protector 50 and a sprinkler head protector screw 48. The "u" shaped blade 46 has a leading cutting edge 47 and an angled trailing edge 45.

Figure 2:
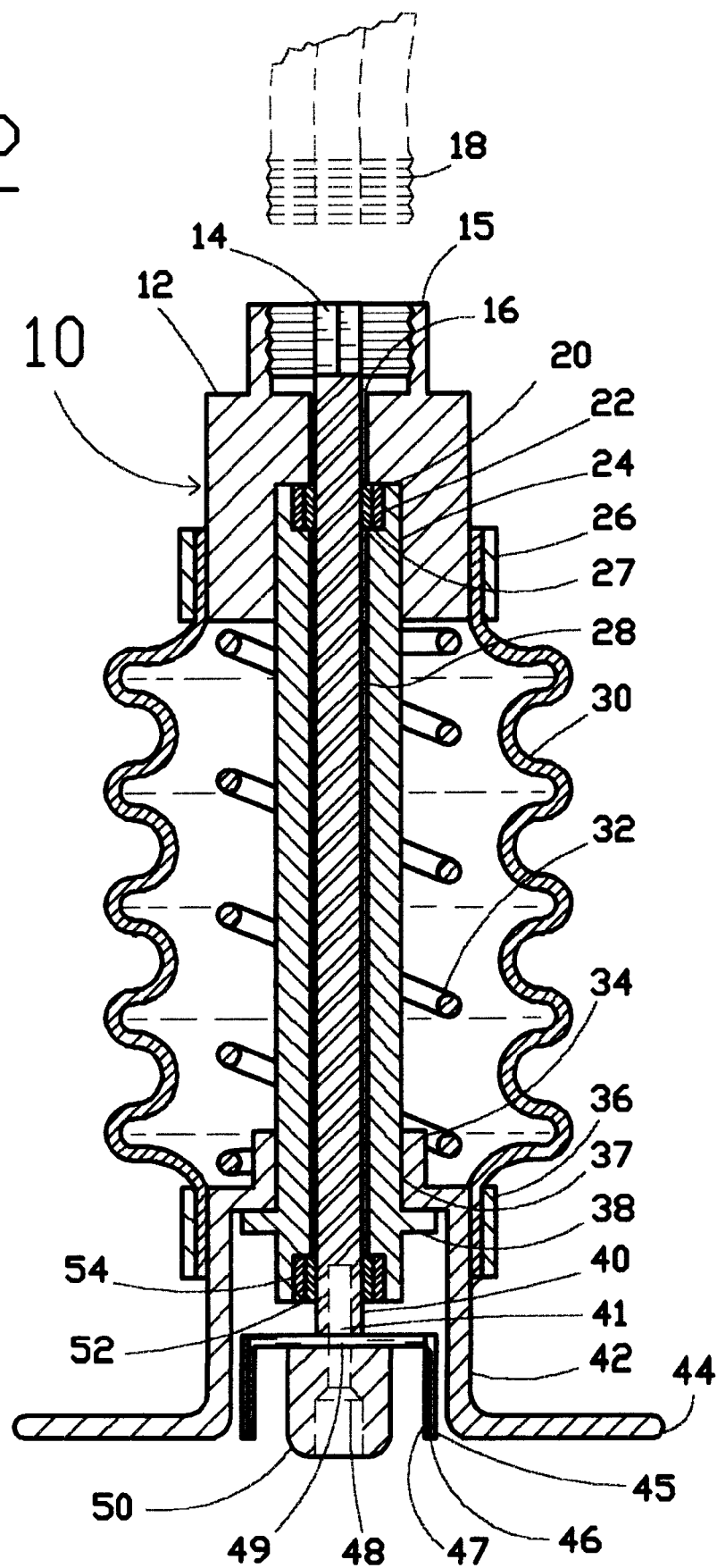
FIG. 2 Is a side elevation view showing the assembly
Figure 3:
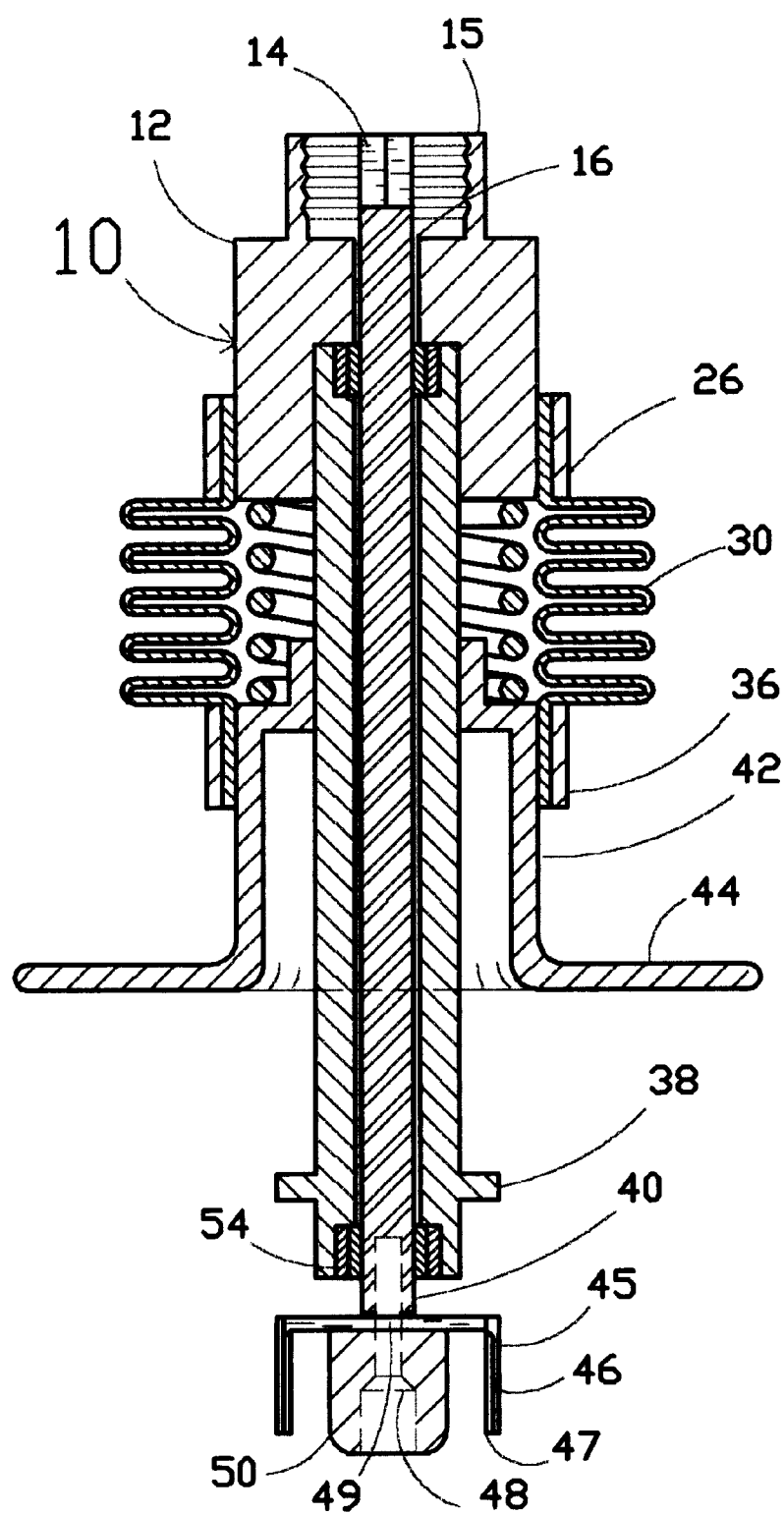
FIG. 3 Is a side elevation view showing the blades extended and the safety shield retracted.

Referring to FIGS. 2 and 3 it can be seen that the device disclosed consists of one casing 12 having a casing through hole 16 and a casing support shaft recess 20. A casing support shaft 24 has an upper bearing recess 27 to support an upper bearing 22 and a lower bearing recess 54, to support the lower bearing 52. A blade drive shaft through hole 28 is centrally located in the casing support shaft 24. The upper and lower support bearings 22 and 52 support a blade drive shaft 40 for rotational movement. Near the end of the casing, support shaft 24 incorporates a safety shield flange 38; this is the supporting flange of the safety shield 42, The safety shield 42 has a centrally located hole 37 and an expanded base plate 44. On the opposite end of the base plate 44 is a safety shield spring guide 34. This safety shield spring guide 34 supports a safety shield spring 32 at one end and the safety shield spring will press against the casing 12 at the opposite end. The blade drive shaft 40 has at the upper end a machined spine 14, engageable and secured by a casing nut 15 onto an electric motor or gas driven device housing 18 and a threaded lower end 41. The threaded lower end 41 supports a "u" shaped blade 46, a sprinkler head protector 50 and sprinkler head protector screw 48 for rotational movement.

The blade drive shaft 40 will be centrally positioned in the upper bearing 22 and lower bearing 52, which are installed in the upper and lower bearing recesses 27 and 54. These recesses 27 and 54 are machined in the casing support shaft 24. The safety shield 42 is slideable down onto the casing support shaft 24 until it comes in contact with the safety shield flange 38 and the safety shield spring 32 is installed down onto the safety shield spring guide 34. With this assembly, the blade drive shaft 40, upper and lower bearings 22, 52, safety shield 42 and safety shield spring 32, the user slides the upper end of the casing support shaft 24 into the casing recess 20, allowing the motor spine 14 to be guided through the casing through hole 16. This completes the first part of the assembly process. Next the sprinkler head protector screw 48 must be inserted into the sprinkler head protector 50 and through a "u" shaped blade hole 49. After this subassembly is completed the user then torques the sprinkler head protector screw 48 into the threaded drive shaft 41. The last assembly process is the installation of the flexible boot 30 over the casing 12 and sliding the flexible boot 30 down and over the first end of the safety shield 42 and securing the flexible boot in place by an upper flexible boot clamp 26 and a lower flexible boot clamp 36.

It will be observed in FIG. 4 that the Grass Trimmer 10 for Pop-Up Sprinklers must be connected to a proper power source 18. As the power is applied to the grass trimmer 10, the user places the safety shield base 44 down on the grass 56 and over the pop-up sprinkler head 57. By applying downward pressure to the safety shield base 44 will compress the internal safety shield spring 32 sliding the safety shield 42 up the casing support shaft 24 and folding the flexible boot 30. This will expose more of the "u" shaped cutting blade 46 to the grass 56. By applying more downward pressure on the safety shield base 44 the two ends of the cutting blade 46 will extend further downward cutting a small cylindrical hole in the grass and roots 58. The blade protector 50 will protect the top surface of the Pop-Up Sprinkler's head 57. The safety shield 42 and safety shield base 44 will remain horizontal to the surface of the grass protecting the person at all times from the "u" shaped blade 46, grass 56 and any other debris that may be thrown up as the blade's cutting leading edges 47 trims the grass 56. The angled trailing edge 45 blows the grass 56 and debris toward the outside diameter of the rotating blade 46. Between the two cutting ends of the blade 46 is the sprinkler head protector 50. When the user releases the downward pressure toward the grass 56 the internal safety shield spring 32 will slide the safety shield 42 down the casing support shaft 24 covering the rotating blade 46.

This invention will be a low-cost unit due to the use of a plastic mold injection system using suitable plastics, such as ABS plastics. The casing 12, casing support shaft 24, safety shield 42 and the sprinkler head protector 50 can be made of a suitable plastic. The flexible boot 30 should be made of rubber or suitable flexible material and the blade drive shaft 40; blade 46, screw 48, spring and clamp mean should be made of steel.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What I claim is:

1. In a grass-cutting device for trimming a small cylindrical shaped hole down to the surface of a pop-up lawn sprinkler head comprising of
   a. a single, generally cylindrical casing,
   b. a casing support shaft supported inside said casing,
   c. a safety shield slideably mounted to said casing support shaft,
   d. a blade drive shaft supported by said casing support shaft,
   e. a "u" shaped blade connected to said blade drive shaft, and
   f. a flexible boot that slides over said casing and said safety shield.

2. The grass-cutting device as defined in claim 1 further including said casing having a centrally located through hole and a cavity at least in one end of said casing.

3. The grass-cutting device as defined in claim 1 further including said casing support shaft with a recess at each end thereof to hold a set of bearings that supports said blade drive shaft for rotational movement.

4. The grass-cutting device as defined in claim 1 including said casing support shaft having near one end thereof a flange, for supporting said safety shield.

5. The grass-cutting device as defined in claim 1 further including said safety shield with a small cylindrical through hole centrally located on one end thereof and forming a second end with an expanded cylindrical wall, said expanded cylindrical wall forming a large flange perpendicular to an open end of said expanded cylindrical wall.

6. The grass-cutting device as defined in claim 1 further including a safety shield spring connected to said safety shield.

7. The grass-cutting device as defined in claim 1 further including said blade drive shaft having a machined first end and an internal threaded second end.

8. The grass-cutting device as defined in claim 1 further including said blade having at least two blades at approximately 90 degrees from the base of the blade; each blade has a sharp leading edge and an outwardly curved trailing edge, for cutting the grass on the leading edge and the trailing edge will create a deflector, deflecting the air and grass cuttings toward the outer diameter of the cylindrical shaped hole.

9. The grass-cutting device as defined in claim 1 further including said blade having a sprinkler head protector having a cylindrical body and a centrally located through hole with a counter bore on at least one end of said centrally located through hole.

10. The grass-cutting device as defined in claim 1 further including said flexible boot having a clamping means at each end thereof.

* * * * *